(12) United States Patent
Samardzija et al.

(10) Patent No.: US 12,160,053 B2
(45) Date of Patent: *Dec. 3, 2024

(54) TUNABLE ANTENNA SYSTEM FOR BLUETOOTH AND WI-FI BANDS WITH ELECTRONICALLY-RECONFIGURABLE AND MECHANICALLY-IDENTICAL ANTENNAS

(71) Applicant: PLUME DESIGN, INC., Palo Alto, CA (US)

(72) Inventors: Miroslav Samardzija, Mountain View, CA (US); Brian Nam, San Jose, CA (US); Liem Hieu Dinh Vo, San Jose, CA (US); William J. Mcfarland, Portola Valley, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,406

(22) Filed: Apr. 7, 2023

(65) Prior Publication Data
US 2023/0246336 A1    Aug. 3, 2023

Related U.S. Application Data

(63) Continuation of application No. 17/046,831, filed as application No. PCT/US2019/032370 on May 15, (Continued)

(51) Int. Cl.
*H04W 4/00* (2018.01)
*H01Q 5/50* (2015.01)
(Continued)

(52) U.S. Cl.
CPC ............ *H01Q 5/50* (2015.01); *H04B 1/0064* (2013.01); *H04B 1/48* (2013.01); *H04W 4/06* (2013.01);
(Continued)

(58) Field of Classification Search
CPC ..... H04W 84/12; H04W 84/18; H04W 80/04; H04W 8/26; H04W 88/06; H04W 4/06;
(Continued)

(56) References Cited

U.S. PATENT DOCUMENTS 7,599,686 B2 * 10/2009 Quinn ................... H04W 16/10
                                                              455/448
9,331,835 B1 *  5/2016 Lee ....................... H04B 1/0057
(Continued)

FOREIGN PATENT DOCUMENTS

JP         2014075725 A  *  4/2014    ............... H01Q 9/32

OTHER PUBLICATIONS

JP 2014/075725 A, English Machine Translation, Apr. 24, 2014, FIT, pp. 1-12. (Year: 2014).*

*Primary Examiner* — Phuongchau Ba Nguyen
(74) *Attorney, Agent, or Firm* — Nicholas Martin; Greenberg Traurig, LLP

(57) ABSTRACT

Systems and methods for operating a radio system include configuring a first antenna of a plurality of antennas in a wireless device to operate in a configured mode of a plurality of modes, wherein the plurality of modes include a first mode of operating as a quarter wave for operation in a 2.4 GHz band, a second mode of operating as a half wave for operation in a 5 GHz band, and a third mode of operating simultaneous as a half wave and a quarter wave for operation in both the 2.4 GHz band and the 5 GHz band; and operating a first radio of a plurality of radios connected to the first antenna in the configured mode of the first antenna.

20 Claims, 13 Drawing Sheets

Related U.S. Application Data 2019, now Pat. No. 11,652,293, which is a continuation of application No. 15/985,287, filed on May 21, 2018, now Pat. No. 10,624,098.

(51) Int. Cl.

| | |
|---|---|
| *H04B 1/00* | (2006.01) |
| *H04B 1/48* | (2006.01) |
| *H04W 4/06* | (2009.01) |
| *H04W 52/18* | (2009.01) |
| *H04W 52/36* | (2009.01) |
| *H04W 52/46* | (2009.01) |
| *H04W 72/044* | (2023.01) |
| *H04W 84/18* | (2009.01) |
| *H04L 1/00* | (2006.01) |
| *H04L 12/18* | (2006.01) |
| *H04L 27/26* | (2006.01) |
| *H04W 52/14* | (2009.01) |
| *H04W 52/24* | (2009.01) |
| *H04W 52/28* | (2009.01) |
| *H04W 52/50* | (2009.01) |
| *H04W 52/54* | (2009.01) |
| *H04W 74/00* | (2009.01) |
| *H04W 84/12* | (2009.01) |

(52) U.S. Cl.
CPC ......... *H04W 52/18* (2013.01); *H04W 52/362* (2013.01); *H04W 52/367* (2013.01); *H04W 52/46* (2013.01); *H04W 72/0473* (2013.01); *H04W 84/18* (2013.01); *H04L 1/0001* (2013.01); *H04L 12/18* (2013.01); *H04L 27/2655* (2013.01); *H04W 52/146* (2013.01); *H04W 52/243* (2013.01); *H04W 52/286* (2013.01); *H04W 52/50* (2013.01); *H04W 52/54* (2013.01); *H04W 74/002* (2013.01); *H04W 84/12* (2013.01)

(58) Field of Classification Search
CPC . H04W 52/18; H04W 52/362; H04W 52/367; H04W 52/46; H04W 72/0473; H04W 52/146; H04W 52/243; H04W 52/286; H04W 52/50; H04W 52/54; H04W 74/002; H01Q 5/50; H01Q 1/2291; H01Q 5/328; H01Q 5/335; H01Q 7/005; H01Q 9/145; H01Q 21/28; H04B 1/0064; H04B 1/48; H04B 1/006; H04L 1/0001; H04L 12/18; H04L 27/2655

See application file for complete search history.

(56) References Cited

U.S. PATENT DOCUMENTS

| | | | | |
|---|---|---|---|---|
| 9,351,338 | B2* | 5/2016 | Amini | H04B 1/0057 |
| 10,624,098 | B2* | 4/2020 | Rudolf | H04W 52/367 |
| 10,840,596 | B2* | 11/2020 | Samardzija | H04W 52/46 |
| 11,652,293 | B2* | 5/2023 | Samardzija | H04B 1/48 |
| | | | | 370/338 |
| 2007/0049213 | A1* | 3/2007 | Tran | H01Q 21/30 |
| | | | | 455/78 |
| 2008/0181151 | A1* | 7/2008 | Feher | H04N 5/40 |
| | | | | 345/173 |
| 2009/0318087 | A1* | 12/2009 | Mattila | H04W 88/06 |
| | | | | 455/63.1 |
| 2010/0290414 | A1* | 11/2010 | Yamada | H04W 16/14 |
| | | | | 370/329 |
| 2013/0183911 | A1* | 7/2013 | Erceg | H04B 1/0458 |
| | | | | 455/78 |
| 2014/0266917 | A1* | 9/2014 | De Luis | H01Q 19/005 |
| | | | | 343/700 MS |
| 2015/0271823 | A1* | 9/2015 | Gao | H04L 67/104 |
| | | | | 370/329 |
| 2016/0173166 | A1* | 6/2016 | Tota | H04L 27/2647 |
| | | | | 455/77 |
| 2018/0132282 | A1* | 5/2018 | Ly | H04L 5/0091 |
| 2019/0097314 | A1* | 3/2019 | Rajagopalan | H01Q 13/10 |
| 2020/0045731 | A1* | 2/2020 | Yiu | H04W 74/006 |
| 2022/0263562 | A1* | 8/2022 | Park | H04W 52/346 |

\* cited by examiner

TN — TERMINATING NETWORK, MN1, MN2 - CAN BE
1. OPEN
2. TERMINATED WITH INDUCTOR
3. TERMINATED WITH CAPACITOR

TUNABLE ANTENNA SYSTEM FOR BLUETOOTH AND WI-FI BANDS WITH ELECTRONICALLY-RECONFIGURABLE AND MECHANICALLY-IDENTICAL ANTENNAS

CROSS-REFERENCE TO RELATED APPLICATION(S)

This application is a continuation of U.S. patent application Ser. No. 17/046,831, filed Oct. 12, 2020 (now U.S. Pat. No. 11,652,293), which is a national stage application of PCT Application No. PCT/US19/32370, with an international filing date of May 15, 2019, which claimed priority to U.S. patent application Ser. No. 15/985,827, filed May 22, 2018 (now U.S. Pat. No. 10,840,596, the contents of each are incorporated by reference in their entirety.

FIELD OF THE DISCLOSURE

The present disclosure generally relates to a wireless antenna system. More particularly, the present disclosure relates to a tunable antenna system for Bluetooth and Wi-Fi bands with electronically-reconfigurable and mechanically-identical antennas.

BACKGROUND OF THE DISCLOSURE

Various devices utilize antennas for wireless communication, such as wireless Access Points (APs), streaming media devices, laptops, tablets, and the like (collectively "wireless devices"). Further, the design trend for such devices is focused on aesthetics, compact form factors, etc. These wireless devices require communication utilizing Wi-Fi and Bluetooth. Wi-Fi requires support for two bands—2.4 GHz and 5 GHz, and Bluetooth requires support for the 2.4 GHz band. Conventional approaches utilize different antennas for these different bands. Of course, this increases the size, cost, complexity, etc. It would be advantageous to provide a radio system that supports tunability (for single 2.4 GHz band, single 5 GHz band, or dual 2.4 GHz/5 GHz operation) and antenna diversity (multiple different antennas) in a manner that minimizes switches, footprint, etc.

BRIEF SUMMARY OF THE DISCLOSURE

In an embodiment, a radio system supporting 2.4 GHz operation, 5 GHz operation, and dual simultaneous 2.4 GHz/5 GHz operation one or more radios; and a plurality of antenna systems connected to the one or more radios via a plurality of switches, wherein each of the plurality of antenna systems includes: an antenna element including a first end and a second end; a terminating network connecting the first end to ground; and a matching network connecting the second end to an antenna port which is communicatively coupled to one or more radios, wherein the antenna element operates as one of a quarter wave, a half wave, based on first settings in the terminating network and the matching network, and wherein the one or more radios are selectively connected to the plurality of antenna systems based on second settings of the plurality of switches. The antenna system can operate as one of a quarter wave, a half wave, and simultaneous operation as half and quarter wave, based on settings in the terminating network and the matching network. The quarter wave can support the 2.4 GHz operation, the half-wave supports the 5 GHz operation, and the half and quarter wave supports the dual simultaneous 2.4 GHz/5 GHz operation.

The terminating network can include a first switch (TN) and the matching network can include a second switch (MN1) and a third switch (MN2), wherein each of the first switch, the second switch, and the third switch select between at least two of open, a bypass, an inductor, and a capacitor. The quarter wave can operate with the TN set to open or through the inductor, with the MN1 set through the capacitor, and with the MN2 set to open; the half wave can operate with the TN set through the capacitor or bypass, with the MN1 set to bypass, and the MN2 set to open, and the half and quarter wave can operate with the TN set through the capacitor, with the MN1 set to bypass, and with the MN2 set through the inductor. The one or more radios can be configured to electronically configure the first settings and the second settings. The first settings can be adjusted to select a band, and the second settings are adjusted to select an appropriate antenna system based on any of diversity, condition number, and pattern. The first settings can be adjusted to select a band, and the second settings are adjusted to select a Multiple-Input and Multiple-Output (MIMO) dimension. The first settings and the second settings can be implemented with a converged mode and Tx/Rx select switch. The antenna element can include a first vertical side with the first end, a second vertical side with the second end, and a horizontal portion between the first vertical side and the second vertical side at an end of each of the first vertical side and the second vertical side opposite of the first end and the second end.

In another embodiment, a configurable dual and single band antenna system includes an antenna element including a first end and a second end; a terminating network connecting the first end to ground; a matching network connecting the second end to an antenna port which is communicatively coupled to one or more radios, wherein the antenna element operates as one of a quarter wave, a half wave, and simultaneous operation as half and quarter wave based on settings in the terminating network and the matching network. The quarter wave can support 2.4 GHz operation, the half-wave can support 5 GHz operation, and the half and quarter wave can support dual simultaneous 2.4 GHz/5 GHz operation. The terminating network can include a first switch (TN) and the matching network can include a second switch (MN1) and a third switch (MN2), wherein each of the first switch, the second switch, and the third switch select between at least two of open, a bypass, an inductor, and a capacitor.

The quarter wave can operate with the TN set to open or through the inductor, with the MN1 set through the capacitor, and with the MN2 set to open; the half wave can operate with the TN set through the capacitor or bypass, with the MN1 set to bypass, and the MN2 set to open, and the half and quarter wave can operate with the TN set through the capacitor, with the MN1 set to bypass, and with the MN2 set through the inductor. The one or more radios can be configured to electronically configure the settings. The antenna element can include a first vertical side with the first end, a second vertical side with the second end, and a horizontal portion between the first vertical side and the second vertical side at an end of each of the first vertical side and the second vertical side opposite of the first end and the second end. The antenna element can be tuned for the quarter wave, the half wave, and the simultaneous operation as half and quarter wave based on elements in the terminating network and the matching network.

In a further embodiment, a method of operating a radio system supporting 2.4 GHz operation, 5 GHz operation, and dual simultaneous 2.4 GHz/5 GHz operation includes selectively connecting one or more radios to a plurality of antenna systems via setting first settings on a plurality of switches, wherein each of the plurality of antenna systems includes an antenna element including a first end and a second end; a terminating network connecting the first end to ground; and a matching network connecting the second end to an antenna port which is communicatively coupled to one or more radios; and causing operation of the antenna element for one or more of the plurality of antenna systems as one of a quarter wave, a half wave, and simultaneous operation as half and quarter wave based on second settings in the terminating network and the matching network. The quarter wave can support the 2.4 GHz operation, the half-wave can support the 5 GHz operation, and the half and quarter wave can support the dual simultaneous 2.4 GHz/5 GHz operation. The method can further include changing an antenna element system for one of the one or more radios based on any of diversity, condition number, and pattern.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to a tunable antenna system for Bluetooth and Wi-Fi bands with electronically-reconfigurable and mechanically-identical antennas. The antenna element system includes a tunable, dual-band (2.4 GHz and 5 GHz) antenna. The antenna can be tunable between single and dual-band, supporting 2.4 GHz operation, 5 GHz operation, and dual simultaneous 2.4 GHz/5 GHz operation. The tuning can be dynamic and electronic (i.e., no physical changes to the antenna element). The tuning is based on conversion from quarter wave to half wave and a mode which operates simultaneously as half and quarter wave, supporting both 2.4 GHz and 5 GHz bands.

A radio system supporting 2.4 GHz operation, 5 GHz operation, and dual simultaneous 2.4 GHz/5 GHz operation includes one or more radios; and a plurality of antenna systems connected to the one or more radios via a plurality of switches, wherein each of the plurality of antenna systems includes an antenna element including a first end and a second end; a terminating network connecting the first end to ground; and a matching network connecting the second end to an antenna port which is communicatively coupled to one or more radios, wherein the antenna element operates as one of a quarter wave, a half wave, and simultaneous operation as half and quarter wave based on first settings in the terminating network and the matching network, and wherein the one or more radios are selectively connected to the plurality of antenna systems based on second settings of the plurality of switches.

Radio System

Figure 1:
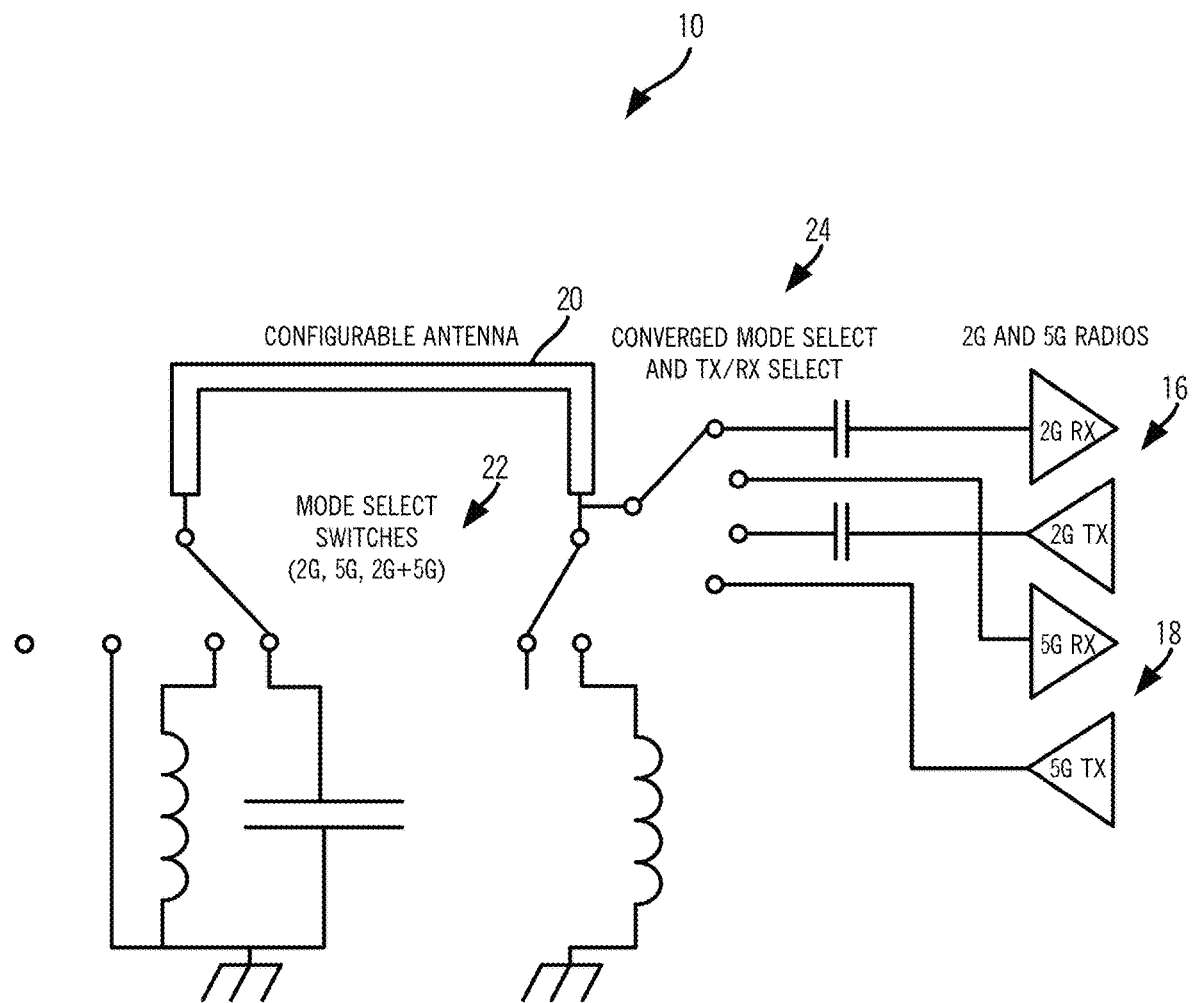
FIG. 1 is a schematic diagram of the radio system which is a converged switch acting as an antenna mode selector and Tx/Rx switch.
Figure 2:
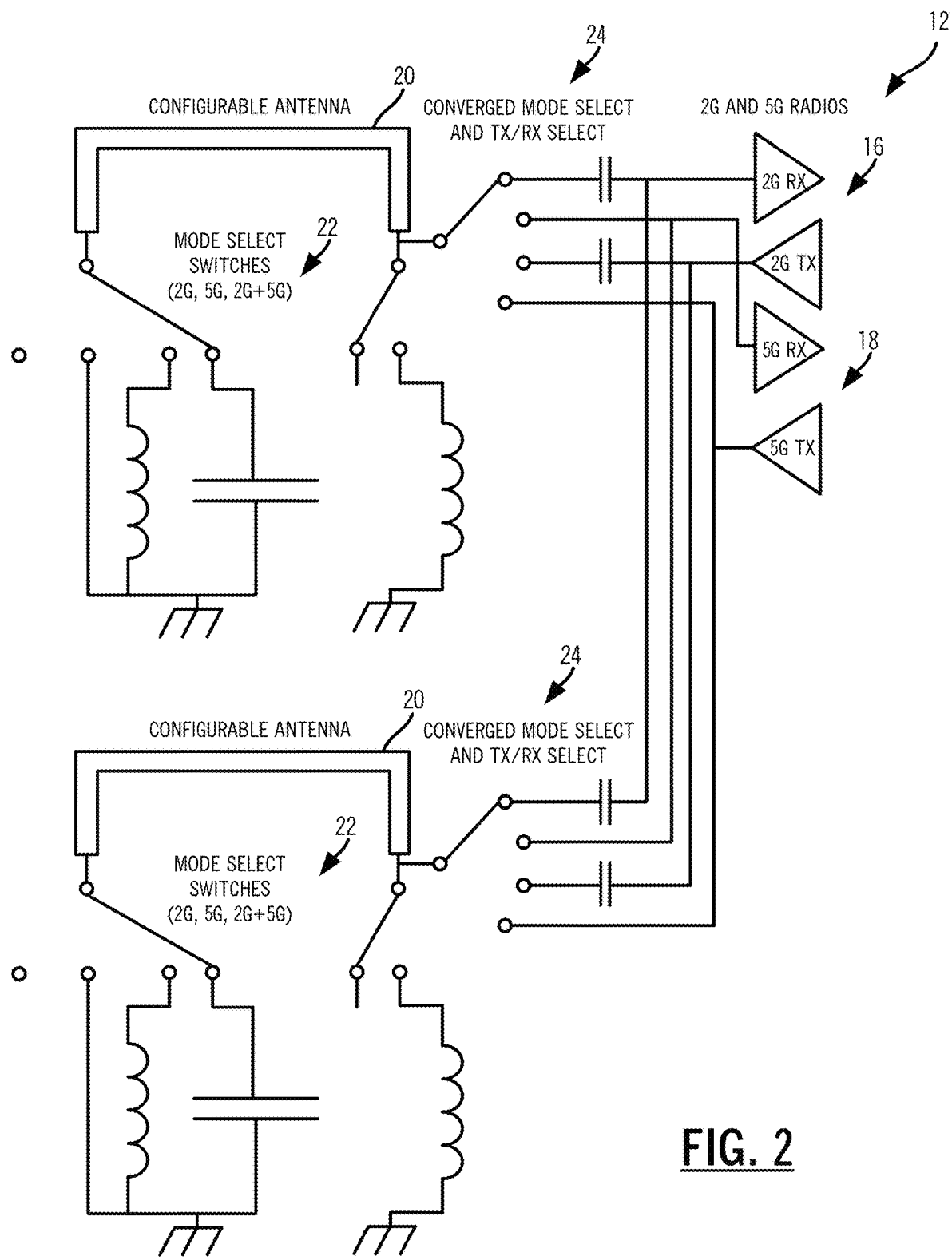
FIG. 2 is a schematic diagram of the radio system which is a converged switch acting as an antenna mode selector, Tx/Rx switch, and diversity switch.
Figure 3:
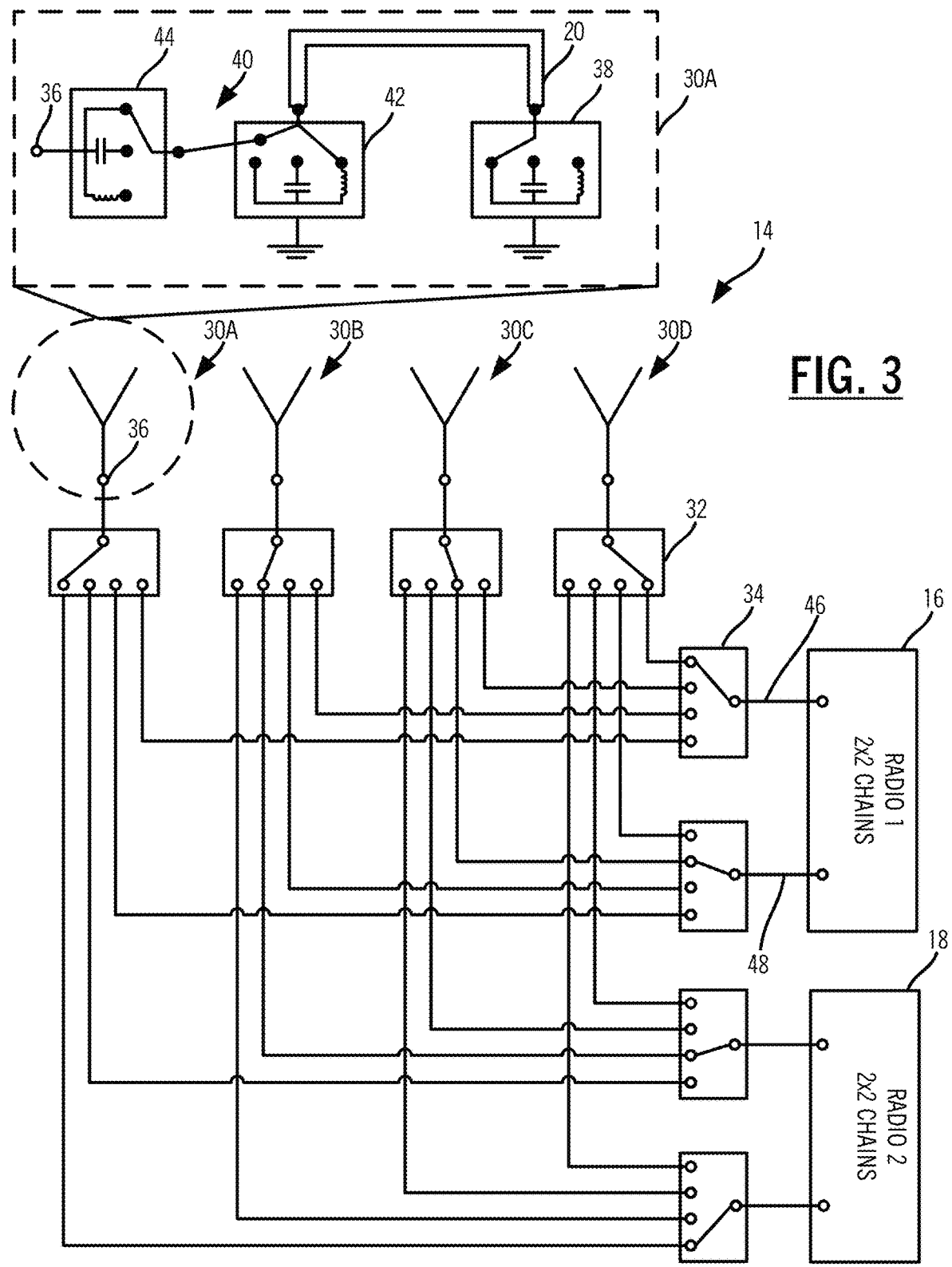
FIG. 3 is a schematic diagram of the radio system with two radios capable of 2×2 Multiple-Input and Multiple-Output (MIMO) 2.4 GHz/5 GHz operation or 4×4 MIMO 5 GHz operation.

FIGS. 1, 2, and 3 are schematic diagrams of radio systems 10, 12, 14. FIG. 1 is a schematic diagram of the radio system 10 which is a converged switch acting as an antenna mode selector and Tx/Rx switch. FIG. 2 is a schematic diagram of the radio system 12 which is a converged switch acting as an antenna mode selector, Tx/Rx switch, and diversity switch. FIG. 3 is a schematic diagram of the radio system 14 with two radios 16, 20 capable of 2×2 Multiple-Input and Multiple-Output (MIMO) 2.4 GHz/5 GHz operation or 4×4

MIMO 5 GHz operation. The radio system 10, 12 include two radios 16, 18, a configurable antenna 20, mode select switches 22 connected to the configurable antenna 20, and a converged mode select and Tx/Rx select switch 24. The radio system 12 further utilizes the switches 24 as diversity switches between different configurable antennas 20.

Radio systems have Radio Frequency (RF) switches that serve as transmit/receive (Tx/Rx) switches, band select switches, diversity switches, or other functions. The transmit/receive switches are used to connect the configurable antenna 20 to either the receiving portion of the radios 16, 18, or the transmitting portion of the radios 16, 18. The radios 16, 18 can operate in a time domain duplex mode, rather than the full-duplex mode, so the radio 16, 18 is either transmitting or receiving at any given time, but not both at once. It is often desirable to isolate the transmitter circuitry from the receive circuitry in the radios 16, 18. This may help provide good matching and tuning to the respective circuits which could not be achieved if both sets of circuits were tied to the same transmission line. Transmitters tend to put out very high-power levels, which can actually sometimes be damaging to the more sensitive receive circuits. Using the switch 24 that connects to only one of the transmitter or receiver at a time can help with these issues.

Diversity switches are used to select one of several antennas 20 for use by the transmitter or receiver. Having multiple antennas 20, at different physical locations and potentially different polarizations, provides diversity gain. If the signal is poor in one location (on one of the antennas 20), the signal may be stronger or better on another antenna 20. If the radio 16, 18 can select either antenna 20, it can potentially improve its performance by selecting the better performing of the antennas 20 for the exact spot the radio 16, 18 is in. Typically, RF switches are used to select which antenna is connected to the Tx or Rx port of the radio at any given time.

Band select switches, such as the mode select switches 22, choose between radios 16, 18 that are operating in different bands. Some radios 16, 18 can make use of a dual-band antenna, such that the same antenna can be used for either 2.4 GHz or 5 GHz signals. However, while the antenna is able to operate in both bands simultaneously, the radios 16, 18 themselves are separate circuits designed specifically for one of the bands. As with the Tx/Rx case described earlier, it may be undesirable to have radios 16, 18 in both of the bands attached to the antenna 20 at the same time. It can be difficult to get the correct tuning/matching of the radios 16, 18 if the 2.4 GHz and 5 GHz radios are connected to each other, and the transmission line that goes to the antenna 20. Again, a set of RF switches that connects only one of the radios 16, 18 at a time is helpful. The mode select switches 22 can switch between a capacitor, an inductor, bypass (short), and open.

The configurable antenna disclosed herein uses RF switches 22, 24 within the antenna structure to select its mode of operation and select proper tuning elements for the antenna 20 to work efficiently. The switches 22, 24 that are part of the configurable antenna 20 would end up in series with the switches in the radios 16, 18 that are acting as Tx/Rx, diversity, or band select antennas. There are disadvantages with cascading switches in series. First, there is added cost to having multiple sets of switches. Second, there is loss going through each switch, and when placed in series both losses occur, doubling the loss of a single switch.

It is possible to combine the two switches that would be in series into a single switch that has more connections within it. For example, rather than cascading two one pole two throw switches, utilizing a single one pole four throw switch. While the switch with more connections is incrementally more complicated, it will still have a lower total cost than two separate switches and will have a lower loss as well.

The radio systems 10, 12, 14 include combining switches that are part of the antenna operation such that they provide multiple functions. In FIG. 1, the radio system 10 combines the antenna mode/tuning switches with the Tx/Rx switch functionality within the radio 16, 18. As shown in FIG. 1, by correctly choosing the 1P4T (1 pole, 4 terminal) switch (i.e., the converged mode select and Tx/Rx select switch 24 is a 1P4T switch), Tx versus Rx, as well as 5 Gb/s vs. 2.4 Gb/s can be selected for both the radio 16, 18 and the antenna 20. In FIG. 2, the radio system 12 extends this concept to antenna diversity as well. Here, there are two antennas 20, each with a 1P4T switch for the converged mode select and Tx/Rx select switch 24. By properly setting these switches, either antenna 20 can be connected to the Tx or Rx, of either of the 2.4 GHz or 5 GHz radios. A single set of switches therefore act as the antenna mode selector, the band select switch, the Tx/Rx switch, and as an antenna diversity switch.

In FIG. 3, the radio system 14 includes four antenna systems 30 (labeled as 30A-30D) connected via 1P4T switches 32, 34 to the radios 16, 18. FIG. 3 illustrates the antenna system 30A in detail. Note, the antenna systems 30B, 30C, 30D are identical even though omitted from the illustration. The antenna system 30 connects to one of the switches 32 via an antenna port 36. The antenna system 30 includes the configurable antenna 20 connected to a terminating switch 38 and tuning/matching network switches 40. The terminating switch 38 is a 1P3T switch with the three terminals connected to ground directly, via a capacitor, and via an inductor. Similarly, the tuning/matching network switches 40 includes a terminating switch 42 which is a 1P3T switch with the three terminals connected to ground directly, via a capacitor, and via an inductor. Collectively, the terminating switches 38, 42 are set to set a mode of the antenna 20. The tuning/matching network switches 40 includes a switch 44 which is a 1P3T switch with the three terminals connected to the antenna port 36 directly, via a capacitor, and via an inductor.

The combinations of the switches 32, 34, 38, 40 are used for the radios 16, 18 to connect to the antennas 20 (i.e., the antenna 20 in each of the antenna systems 30A, 30B, 30C, 30D) as well as to select the band. For example, the radio 16 can support 2×2 MIMO operation in the 2.4 GHz band or 2×2 MIMO operation in the 5 GHz band, at one time, and the radio 18 can support 2×2 operation in the 5 GHz band. Accordingly, any system utilizing the radio system 14 can support 2×2 MIMO 2.4 GHz operation and 2×2 MIMO 5 GHz operation or 4×4 MIMO 5 GHz operation based on the switch configuration. Each of the radios 16, 18 include two chains 46, 48 which selectively connect to the antenna systems 30A, 30B, 30C, 30D via the switches 32, 34.

The radio system 14 is an exemplary embodiment of how the reconfigurable antennas 20 allow the radios 16, 18 to be optimized for 2.4 GHz, 5 GHz, and dual simultaneous 2.4 GHz/5 GHz operation. The radio 16 has two chains 46, 48 for supporting 2.4 GHz or 5 GHz operation and the radio 18 has two chains 46, 48 for supporting 5 GHz operation. Thus, the radio system 14 can support a 4 chain 5 GHz system (4×4 MIMO) or a 2 chain 2.4 GHz system and a 2 chain 5 GHz system. In the 4 chain 5 GHz system, the radios 16, 18 can pick any of the antenna systems 30A, 30B, 30C, 30D as needed or required. Also, in any configuration, the radios 16, 18 can select any of the antenna systems 30A, 30B, 30C, 30D needed. This allows for the radios 16, 18 to pick up antennas on different location in a product.

Example Wireless Device

Figure 4:
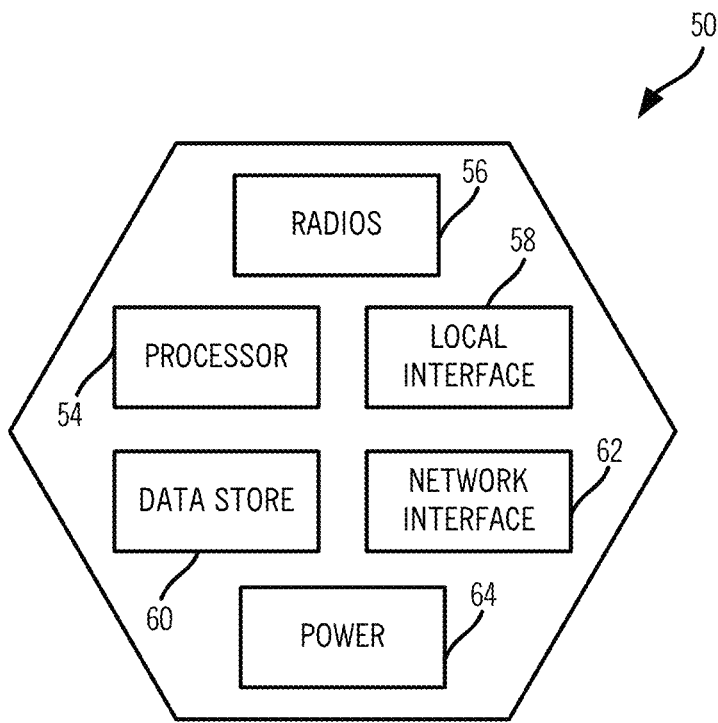
FIG. 4 is a block diagram of functional components of a wireless access point as an example wireless device implementing the radio system described herein.
Figure 5:
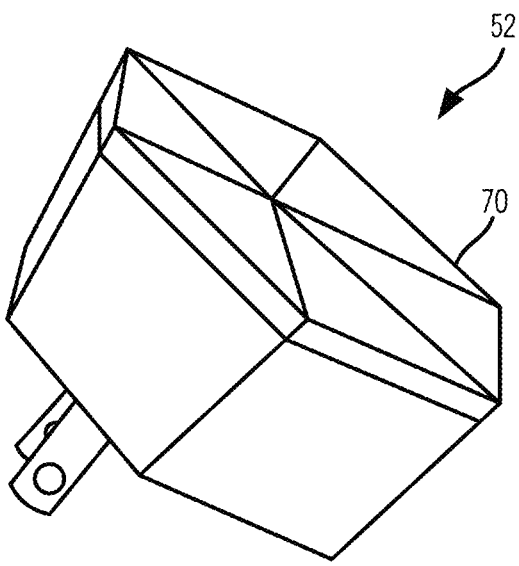
FIG. 5 is a perspective diagram of a physical form factor for the wireless access point of FIG. 4.

FIG. 4 is a block diagram of functional components of a wireless access point 50 as an example wireless device implementing the radio system 14 described herein. FIG. 5 is a perspective diagram of a physical form factor 52 for the wireless access point 50. The access point 50 includes the physical form factor 50 which contains a processor 54, a plurality of radios 56, a local interface 58, a data store 60, a network interface 62, and power 64. It should be appreciated by those of ordinary skill in the art that FIG. 4 depicts the access point 50 in an oversimplified manner, and a practical embodiment may include additional components and suitably configured processing logic to support features described herein or known or conventional operating features that are not described in detail herein.

In an exemplary embodiment, the form factor 52 is a compact physical implementation where the access point 50 directly plugs into an electrical socket and is physically supported by the electrical plug connected to the electrical socket. This compact physical implementation is ideal for a large number of access points 50 distributed throughout a location. The processor 54 is a hardware device for executing software instructions. The processor 54 can be any custom made or commercially available processor, a central processing unit (CPU), an auxiliary processor among several processors, a semiconductor-based microprocessor (in the form of a microchip or chip set), or generally any device for executing software instructions. When the access point 50 is in operation, the processor 54 is configured to execute software stored within memory or the data store 60, to communicate data to and from the memory or the data store 40, and to generally control operations of the access point 50 pursuant to the software instructions. In an exemplary embodiment, the processor 54 may include a mobile-optimized processor such as optimized for power consumption and mobile applications.

The radios 56 enable wireless communication. The radios 56 can operate according to the IEEE 802.11 standard and variants thereof. The radios 56 include address, control, and/or data connections to enable appropriate communications on a Wi-Fi system. As described herein, the access point 50 includes the radios 16, 18 to support different links, i.e., backhaul links and client links. In an exemplary embodiment, the access point 50 can support dual-band operation simultaneously operating 2.4 GHz and 5 GHz 2×2/4×4 MIMO 802.11b/g/n/ac radios having operating bandwidths of 20/40 MHz for 2.4 GHz and 20/40/80 MHz for 5 GHz. For example, the access point 50 can support IEEE 802.11AC1200 gigabit Wi-Fi (300+867 Mbps). Also, the radios 56 can include a Bluetooth interface as well for local access, control, onboarding, etc. The radios 36 contemplate using the radio systems 10, 12, 14 described herein.

The local interface 58 is configured for local communication to the access point 50 and can be either a wired connection or wireless connection such as Bluetooth or the like. Since the access point 50 can be configured via the cloud, an onboarding process is required to first establish connectivity for a newly turned on access point 50. In an exemplary embodiment, the access point 50 can also include the local interface 58 allowing connectivity to a user device for onboarding to a Wi-Fi system such as through an app on the user device. The data store 60 is used to store data. The data store 60 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 60 may incorporate electronic, magnetic, optical, and/or other types of storage media.

The network interface 62 provides wired connectivity to the access point 50. The network interface 62 may be used to enable the access point 50 communicate to a modem/router. Also, the network interface 62 can be used to provide local connectivity to a user device. For example, wiring in a device to an access point 50 can provide network access to a device which does not support Wi-Fi. The network interface 62 may include, for example, an Ethernet card or adapter (e.g., 10BaseT, Fast Ethernet, Gigabit Ethernet, 10 GbE). The network interface 62 may include address, control, and/or data connections to enable appropriate communications on the network. The processor 54 and the data store 60 can include software and/or firmware which essentially controls the operation of the access point 50, data gathering and measurement control, data management, memory management, and communication and control interfaces with the cloud.

Physical Implementation

Figure 6:
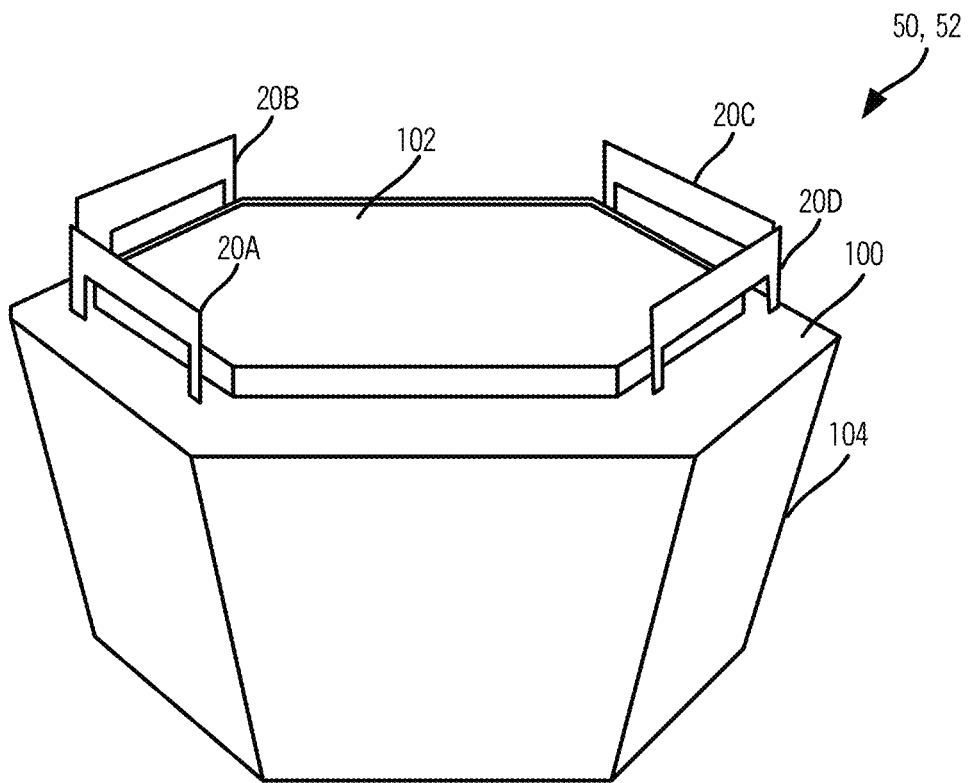
FIG. 6 is a perspective diagram of the access point of FIG. 4 and the form factor with a top portion removed.
Figure 7:
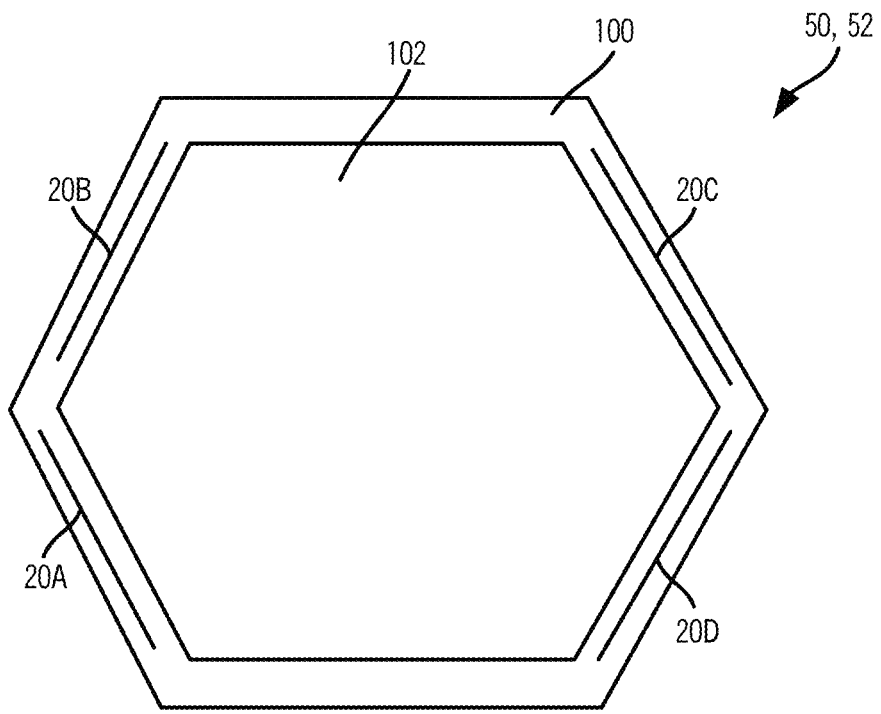
FIG. 7 is a top view of the access point of FIG. 4 and the form factor with the top portion removed.

FIG. 6 is a perspective diagram of the access point 50 and the form factor 52 with a top portion 70 removed. FIG. 7 is a top view of the access point 50 and the form factor 52 with the top portion 70 removed. The access point 50 can utilize the radio system 14 with four of the antenna systems 30A, 30B, 30C, 30D. Specifically, the access point 50 can include support Wi-Fi and Bluetooth with the antenna systems 30A, 30B, 30C, 30D. The antenna systems 30A, 30B, 30C, 30D are identical elements for covering the Bluetooth 2.4 GHz band, the Wi-Fi 2.4 GHz band, and the Wi-Fi 5 GHz band, individually or simultaneously. The access point 50 can support the radios 16, 18 selecting the chains 46, 48 and allocating to desired bands. Advantageously, the design presented herein includes one radio system 30 implementation which can be reproduced and used in combination to make "different" antennas supporting the Wi-Fi and Bluetooth bands.

In FIGS. 6 and 7, the access point 50 includes four identical configurable antennas 20A, 20B, 20C, 20D part of the antenna systems 30A, 30B, 30C, 30D. The access point 50 includes an RF Printed Circuit Board (PCB) 100 for the antenna systems 30A, 30B, 30C, 30D and their associated radio systems 14, an RF shield 102 over the radio system 14 which includes the antenna systems 30A, 30B, 30C, 30D, and a heatsink 104.

Advantageously, all the antenna systems 30A, 30B, 30C, 30D is physically and mechanically identical (except for location) in the access point 50. This provides efficiency in manufacturing, cost, etc. The access point 50 and the radios 16, 18 can select the best antenna systems 30A, 30B, 30C, 30D as needed for system performance, e.g., based on the position of the access point 50 in deployment and other factors.

Antenna System

Figure 8:
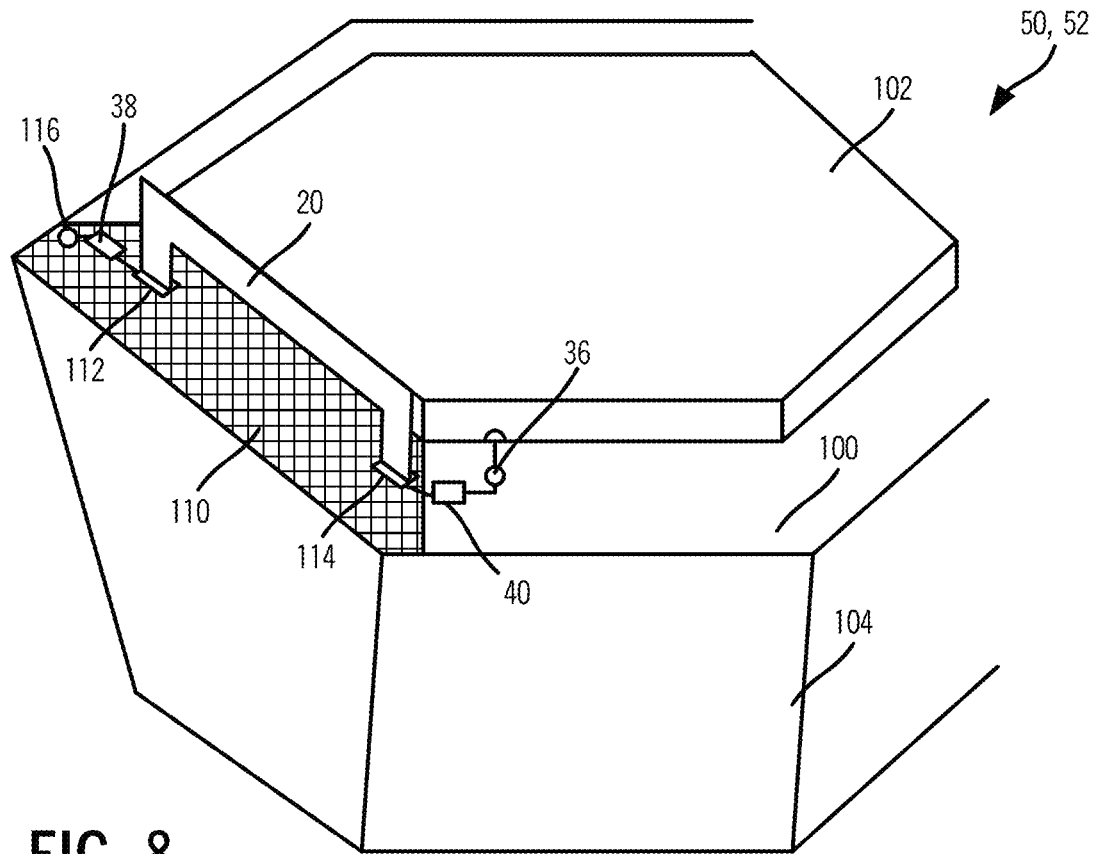
FIG. 8 is a perspective diagram of a portion of the access point illustrating a single antenna system and physical connectivity to the associated configurable antenna.
Figure 9:
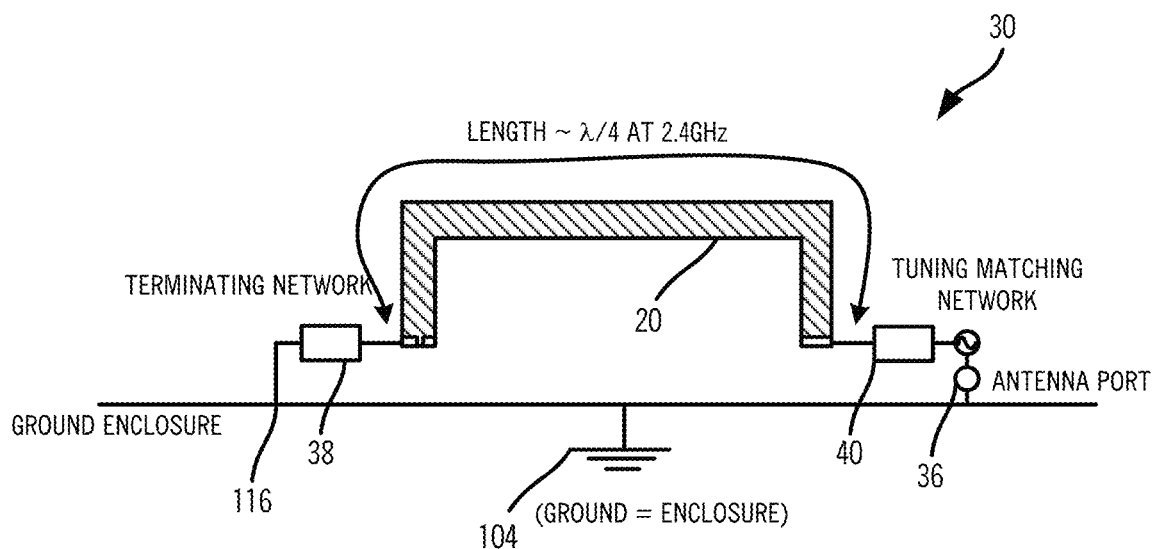
FIG. 9 is a diagram of an element view of the single antenna system.

FIG. 8 is a perspective diagram of a portion of the access point 50 illustrating a single antenna system 30 and physical connectivity to the associated configurable antenna 20. FIG. 9 is a diagram of an element view of the single antenna system 30. The RF PCB 100 includes a cleared ground 110. The configurable antenna 20 is supported on the cleared ground 110 via feet 112, 114. The tuning/matching network switch 40 on the RF PCB 100 connects to the configurable antenna 20 at the foot 114 and the antenna port 36 connects to the tuning/matching network switch 40 and provides a connection to the radios 16, 18 inside of the RF shield 102.

The terminating switch 38 connects to the configurable antenna 20 at the foot 112 and to a ground connector 116 such as a screw which grounds the RF PCB 100 to a metallic enclosure of the heatsink 104. FIG. 9 illustrates the element view of the single antenna system 30 in FIG. 8 illustrating circuit connectivity. The configurable antenna 20 is shaped with two vertical sides and a horizontal portion interconnecting the two vertical sides. The length overall of the two vertical sides and the horizontal portion is about λ/4 at 2.4 GHz.

Figure 10:
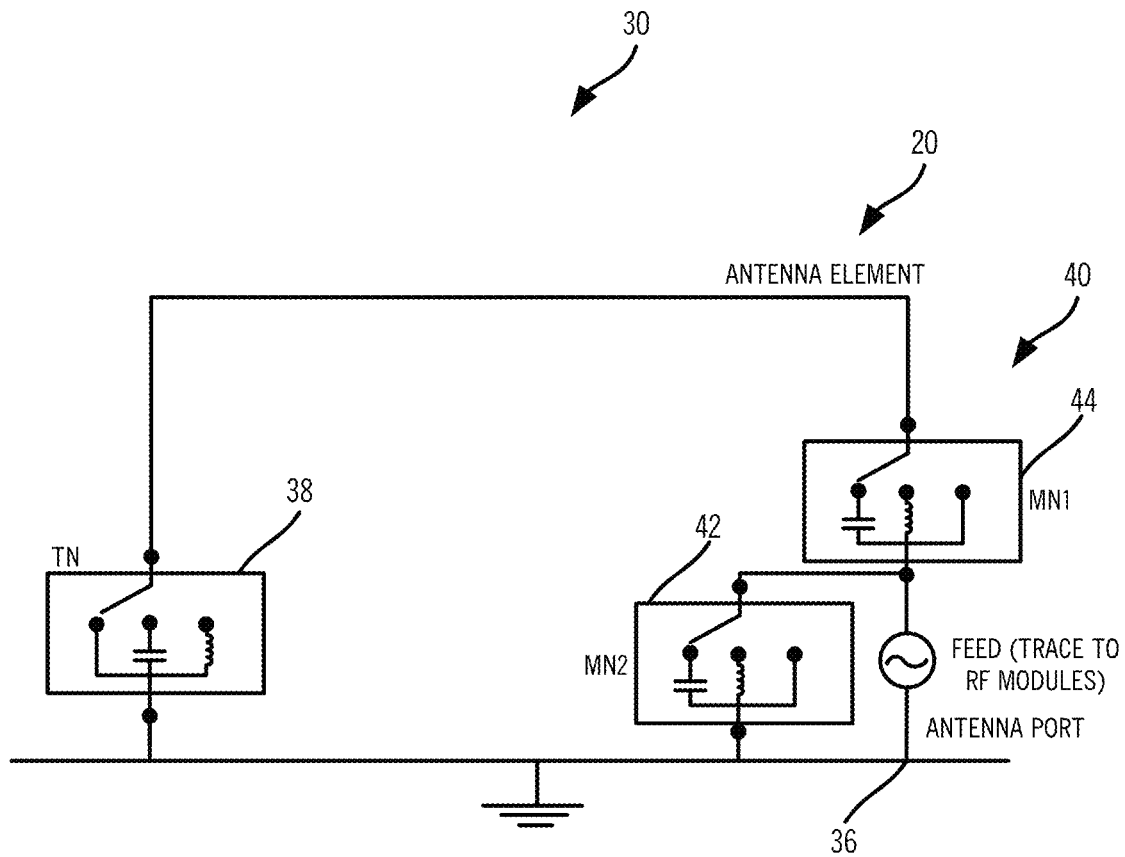
FIG. 10 is a schematic diagram of the single antenna system in FIG. 8 illustrating circuit connectivity.

FIG. 10 is a schematic diagram of the single antenna system 30 in FIG. 8 illustrating circuit connectivity. The switch 38 is a terminating network and is denoted as TN and the tuning/matching network switch 40 includes the switches 42, 44 each is a matching network and the switch 42 is denoted as MN2 and the switch 44 is denoted as MN1. Each of the switches 38, 42, 44 are a 1P3T switch with connectively direct, via a capacitor, and via an inductor. Each of the TN, MN1, and MN2 can be (1) open, (2) terminated with an inductor, and (3) terminated with a capacitor.

Figure 11:
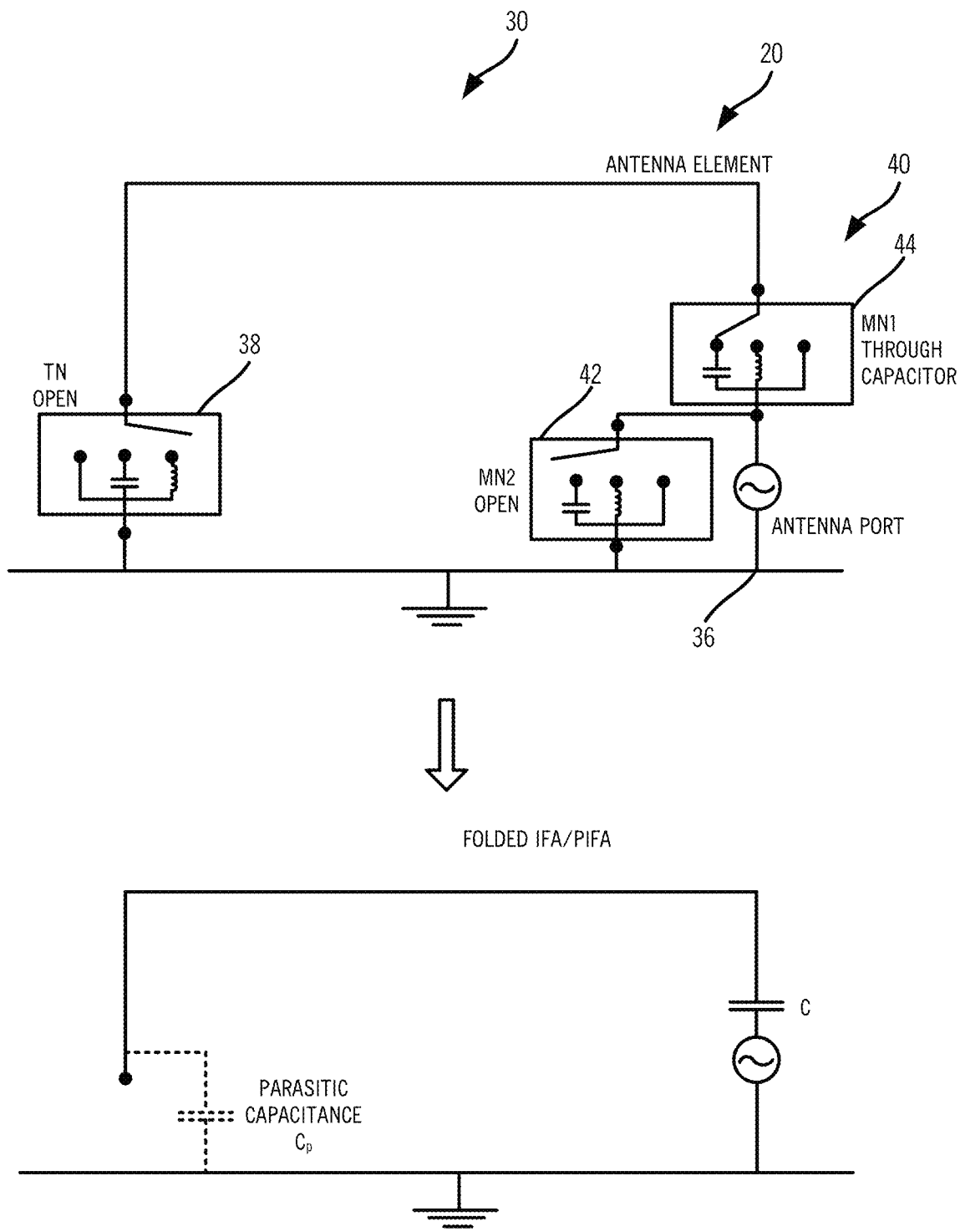
FIG. 11 is a schematic diagram of the single antenna system in FIG. 8 illustrating circuit connectivity in a 2.4 GHz configuration.

FIG. 11 is a schematic diagram of the single antenna system 30 in FIG. 8 illustrating circuit connectivity in a 2.4 GHz configuration. In the 2.4 GHz configuration, the TN is open (not connected to any of the terminals), the MN2 is open (not connected to any of the terminals), and the MN2 is set through the capacitor. The effective circuit is similar to a folded inverted F antenna (IFA) or planar IFA (PIFA). The capacitor in the MN2 can be set to between 0.3 to 1 pF and this capacitor is in series to compensate for the "over-inductiveness" of the antenna 20. There is a capacitor shown in dotted line between the TN and ground to reflect parasitic capacitance due to the foot 112. The parasitic capacitance is between the support foot 112 and ground 110 on the PCB 100. This parasitic capacitance will naturally tune the antenna 20 low when the antenna 20 is in the 2.4 GHz mode. This Cp is inherent or build in due to implementation antenna 20 on the PCB 100 by the Surface Mount Technology (SMT) process.

Figure 12:
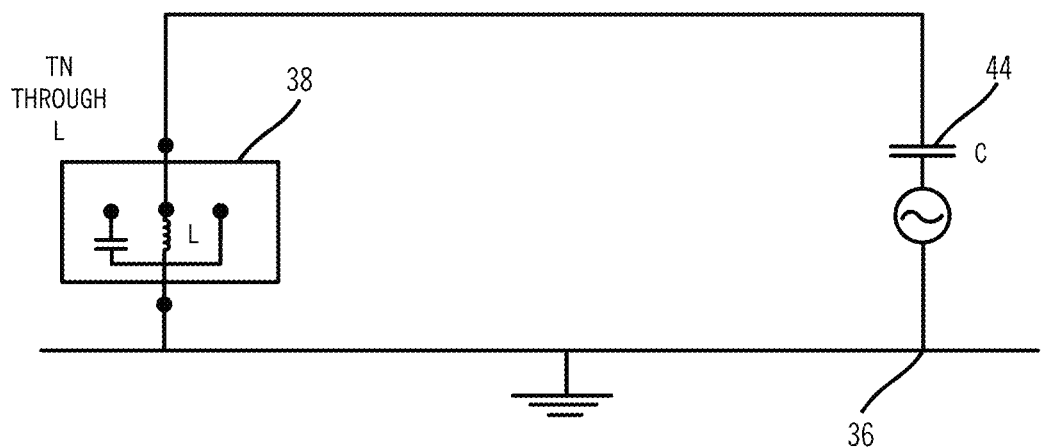
FIG. 12 is a schematic diagram of the single antenna system in FIG. 11 illustrating circuit connectivity with the terminating network (TN) connected through the inductor in a 2.4 GHz configuration.
Figure 13:
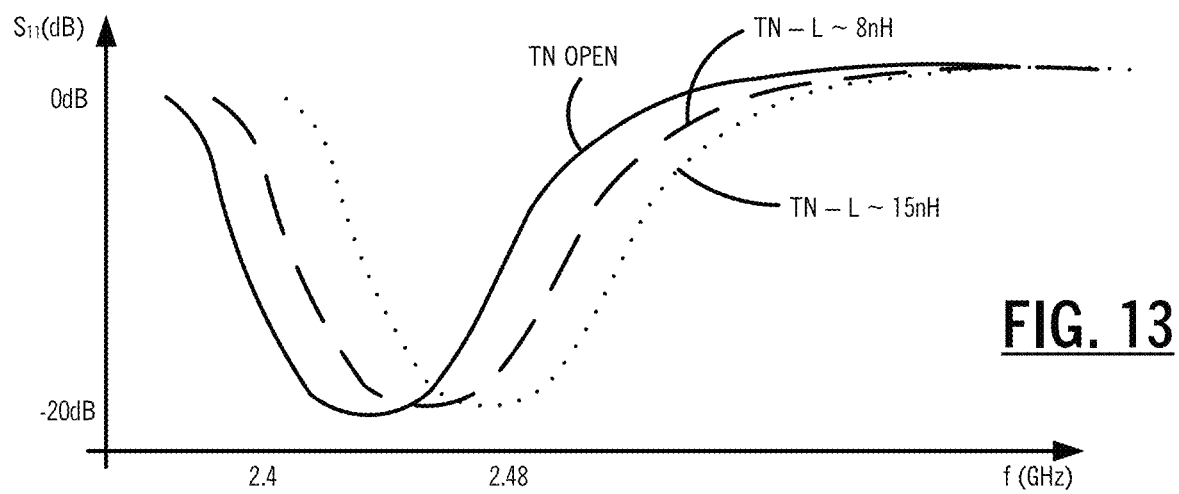
FIG. 13 is a graph which illustrates the scattering parameter $S_{11}$ versus frequency illustrating the effect of the inductor in a 2.4 GHz configuration.
Figure 14:
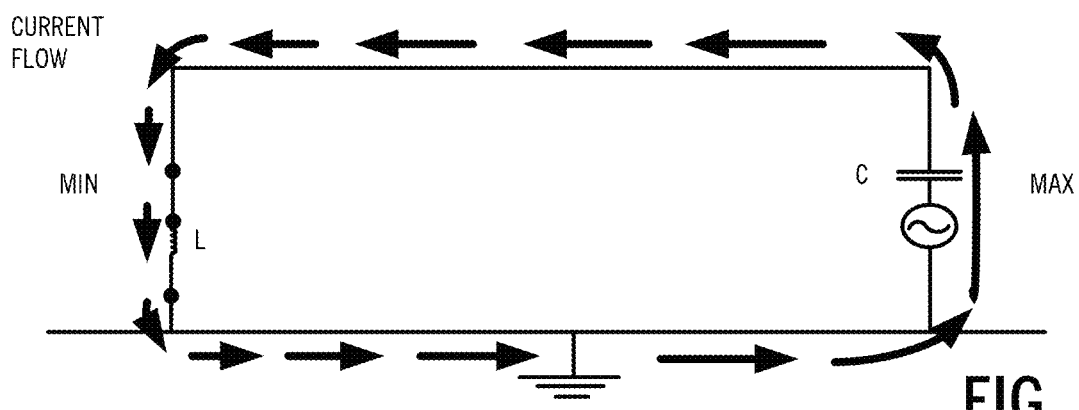
FIG. 14 is a schematic diagram of the current flow in the schematic diagram of FIG. 12 in a 2.4 GHz configuration.

FIG. 12 is a schematic diagram of the single antenna system 30 in FIG. 11 illustrating circuit connectivity with the terminating network (TN) connected through the inductor. FIG. 13 is a graph which illustrates the scattering parameter $S_{11}$ versus frequency illustrating the effect of the inductor. FIG. 14 is a schematic diagram of the current flow in the schematic diagram of FIG. 12. Terminating the TN through the inductor tunes the antenna 20 higher by counteracting the parasitic capacitance that the antenna feet 112, 114 add between the antenna 20 and the heat sink at termination. Thus, the inductor acts as a tuning know for fine tuning resonance in the 2.4 GHz band. The capacitor in the MN1 is a matching know minimizing the reflected input power and typically ranges between about 0.3 to 1.5 pF. The graph in FIG. 14 illustrates different values for the TN inductor. Note, the size (length) of the arrows is used to indicate current intensity. In this configuration, L is high value at 2.4 GHz and 5 GHz making this section almost open. Some inductance is still needed to compensate for Parasitic Capacitance Cp. L is tuning knob around 2.5 GHz when element in 2.4 GHz mode. The terminating element with L is highly counter intuitive because one would think it would "break" the quarter wavelength requirement for IFA/PIFA element in 2.4 HzG mode. In reality, it does not break this requirement because L is neutralized by the parasitic capacitance.

Figure 15:
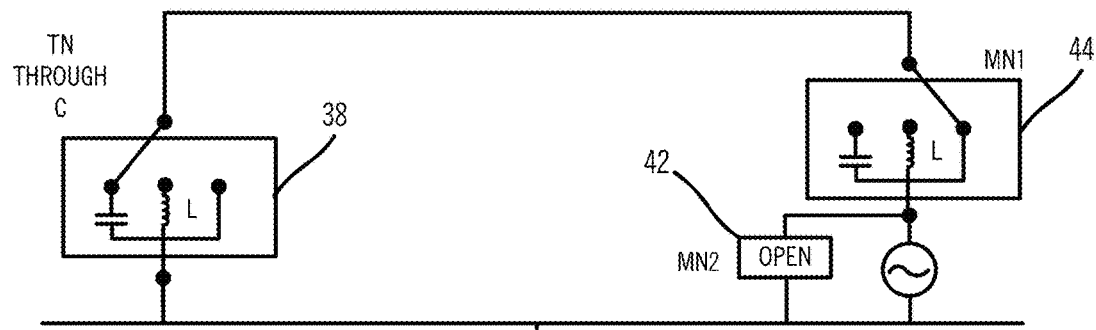
FIG. 15 is a schematic diagram of the single antenna system in FIG. 8 illustrating circuit connectivity in a 5 GHz configuration along with the associated current flow.
Figure 16:
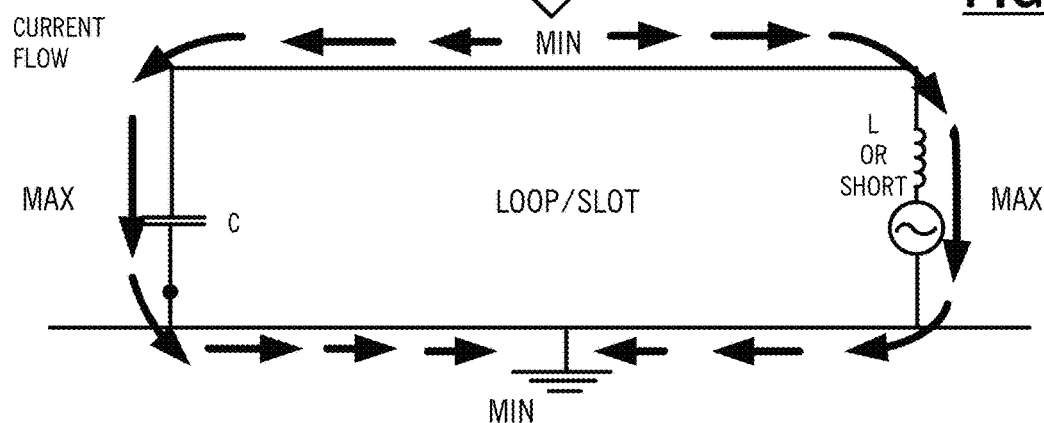
FIG. 16 is a graph which illustrates the scattering parameter $S_{11}$ versus frequency illustrating the effect of the capacitor in a 5 GHz configuration.
Figure 16:
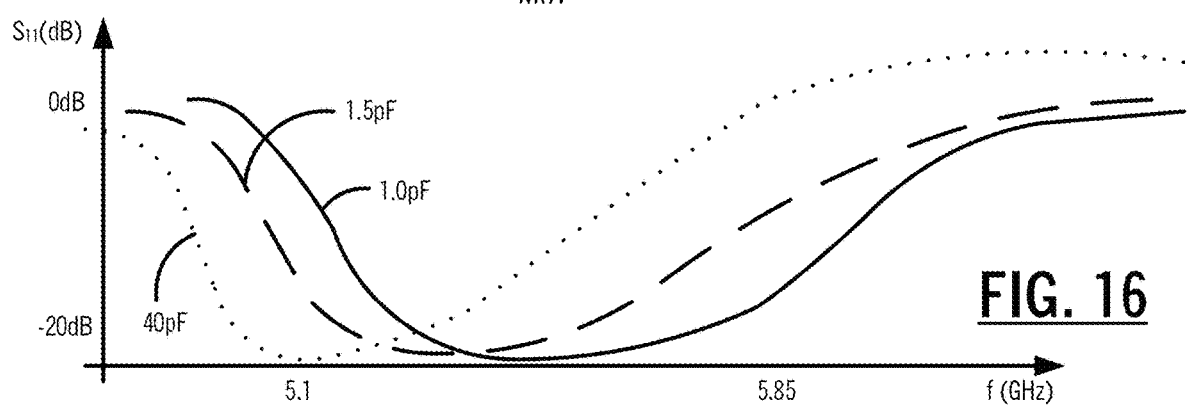
Figure 17:
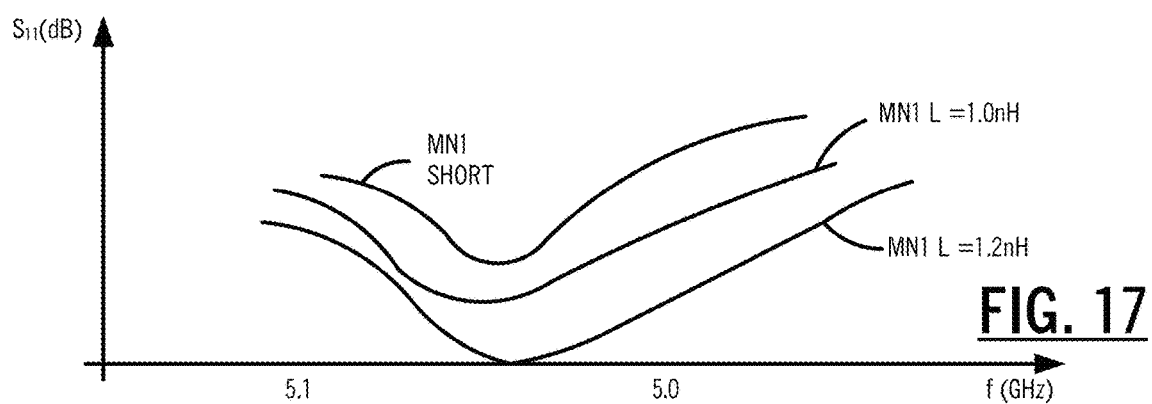
FIG. 17 is a graph which illustrates the scattering parameter $S_{11}$ versus frequency illustrating matching resonance at 5 GHz with different values of inductance in a 5 GHz configuration.

FIG. 15 is a schematic diagram of the single antenna system 30 in FIG. 8 illustrating circuit connectivity in a 5 GHz configuration along with the associated current flow. FIG. 16 is a graph which illustrates the scattering parameter $S_{11}$ versus frequency illustrating the effect of the capacitor. FIG. 17 is a graph which illustrates the scattering parameter $S_{11}$ versus frequency illustrating matching resonance at 5 GHz with different values of inductance. For the 5 GHz configuration, the TN (switch 38) is configured through the capacitor, the MN2 (switch 42) is open, and the MN1 (switch 44) is shorted for an effective length L of about λ/2 for the antenna 20. Here, the antenna system 30 operates as a loop/slot antenna with the current flow. In this configuration, the capacitor C in TN is acting as a semi-block at 2.4 GHz but as semi-short at 5 GHz. Increasing C adds up to parasitic capacitance and tunes the loop/slot resonance lower in the 5 GHz band. In the graph of FIG. 16, different capacitance values are shown for tuning the antenna 20 lower to adjust to the effective length L of about λ/2. Here, the capacitor C in the TN is a tuning knob for fine tuning resonance into the band. FIG. 17 illustrates different inductance values on the MN2 for the foot 114. Here, the inductor L in MN1 is a matching knob minimizing reflected input power.

Figure 18:
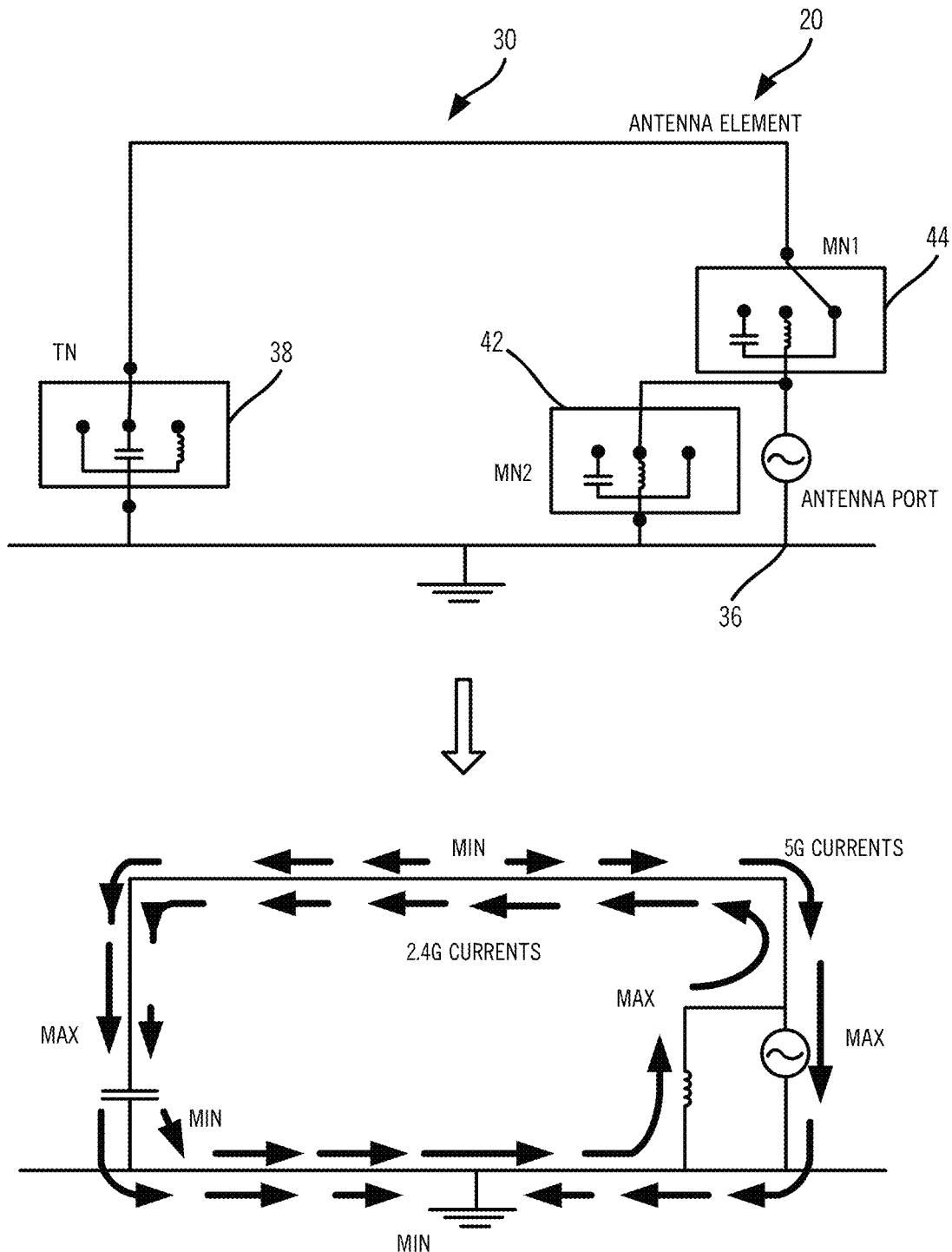
FIG. 18 is a schematic diagram of the single antenna system in FIG. 8 illustrating circuit connectivity in a dual 2.4 GHz and 5 GHz configuration along with the associated current flow.

FIG. 18 is a schematic diagram of the single antenna system 30 in FIG. 8 illustrating circuit connectivity in a dual 2.4 GHz and 5 GHz configuration along with the associated current flow. In this configuration, the TN (switch 38) is configured through the capacitor, the MN2 (switch 42) is configured through the inductor, and the MN1 (switch 44) is short. The antenna 20 here operates as a combined loop/slot and IFA antenna. The current flow illustrates the 2.4 GHz and 5 GHz currents. The capacitor in the TN appears open at 2.4 GHz (blocked) and the inductor in the MN2 appears open at 5 GHz (choked). Again, the size (length) of the arrows is used to indicate current intensity. In this configuration, the capacity C in the TN is high enough to present itself as short for 5 GHz and low enough to present itself as open to 2 GHz. In this configuration, the inductor L in MN2 is high enough to present itself as open for 5 GHz and inductive to 2.4 GHz.

Figure 19:
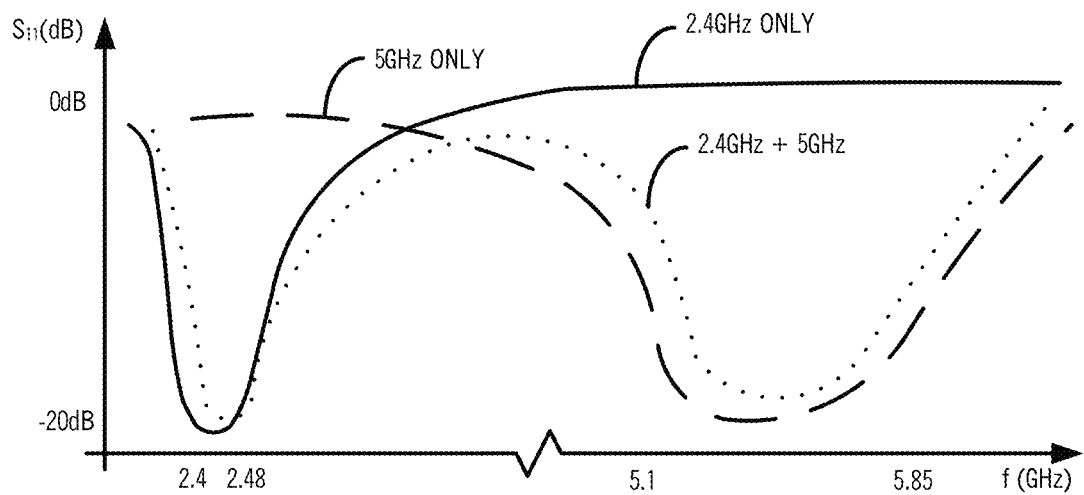
FIG. 19 is a graph which illustrates the scattering parameter $S_{11}$ versus frequency illustrating operating in a 2.4 GHz configuration, a 5 GHz configuration, and a dual simultaneous 2.4 GHz/5 GHz configuration for the antenna system.
Figure 20:
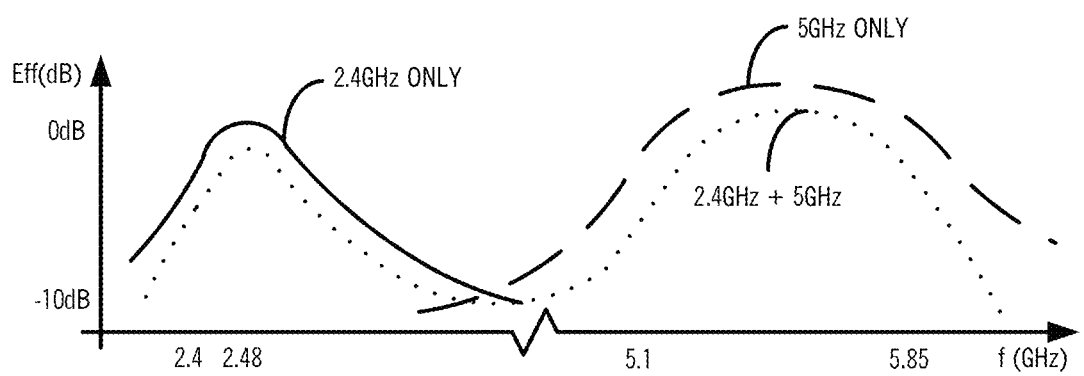
FIG. 20 is a graph which illustrates the efficiency versus frequency illustrating operating in a 2.4 GHz configuration, a 5 GHz configuration, and a dual simultaneous 2.4 GHz/5 GHz configuration for the antenna system.

FIG. 19 is a graph which illustrates the scattering parameter $S_{11}$ versus frequency illustrating operating in a 2.4 GHz configuration, a 5 GHz configuration, and a dual simultaneous 2.4 GHz/5 GHz configuration for the antenna system 30. FIG. 20 is a graph which illustrates the efficiency versus frequency illustrating operating in a 2.4 GHz configuration, a 5 GHz configuration, and a dual simultaneous 2.4 GHz/5 GHz configuration for the antenna system 30. The configuration of the switches 38, 42, 44 (TN, MN2, MN1) is as follows:

| | | |
|---|---|---|
| 2.4 GHz only (quarter wave) | TN (switch 38)-OPEN or through the inductor (about 8 to 15 nH) MN 1 (switch 44)-through capacitor MN2 (switch 42)-OPEN | |
| 5 GHz only (half wave) | TN (switch 38)-short (bypass) or through capacitor (about 0.5 to 2.5 pF) MN 1 (switch 44)-short (bypass) or through the inductor MN2 (switch 42)-OPEN | |

| | |
|---|---|
| 2.4 GH + 5 GHz (half and quarter wave) | TN (switch 38)-through capacitor (about 0.5 to 2.5 pF)<br>MN 1 (switch 44)-short (bypass)<br>MN2 (switch 42)-through inductor |

Advantageously, the radios 16, 18 can be configured to selectively use any of the antenna systems 30A, 30B, 30C, 30D such as to avoid nulls and steer the beam. The radios 16, 18 can use 2 chains 46, 48 in 2 GHz and 2 chains 46, 48 in 5 GHz or 4 chains 46, 48 in 5 GHz.

The antenna systems 30A, 30B, 30C, 30D can be controlled by the radios 16, 18 for tuning and band configuration. In a dual-band configuration (2.4 GHz/5 GHz), the antenna system 30 operates simultaneously as half and quarter wave in the different bands. The antenna system 30 has better isolation and efficiency when operating in a single band (2.4 GHz or 5 GHz). The antenna system 30 can be tuned dynamically and electronically which no physical changes to the antenna 20 or to the hardware (except for switch changes).

The antenna system 30 tuning converts the antenna 20 from quarter wave to half wave including a mode for simultaneous operation as half and quarter wave, specifically for 2.4 GHz and 5 GHz band as these are both Wi-Fi and are almost 2:1 in frequency. The antenna 20 includes the switches 38, 42, 44 on each end for tuning.

The inductor can be used get better open in the 2.4 GHz mode, compensating for the capacitance of the feet 112, 114 on the RF PCB 100 (relates to manufacturability). The capacitance at the end gets a bigger loop (change effective length) in the 5 GHz loop mode. The inductor in shunt at the source is to match in the dual mode operation with the capacitance at the end.

The wireless access point 50 can use the radios 16, 18 to reconfigure the antenna systems 30A, 30B, 30C, 30D to support reconfigurable MIMO dimensions without requiring a larger number of antennas 20. The radios 16, 18 can be configured for antenna swapping for diversity (fading), condition number (MIMO channel dimension), antenna pattern (directional gain pattern selection), etc.

A single antenna system 30 can serve as 2.4 GHz, 5 GHz, or dual-band, with just different tuning elements or different states of the tuning on the board. The advantages of this approach are economy of tooling, volume, inventory, etc.

Antenna Implementation

Figure 21:
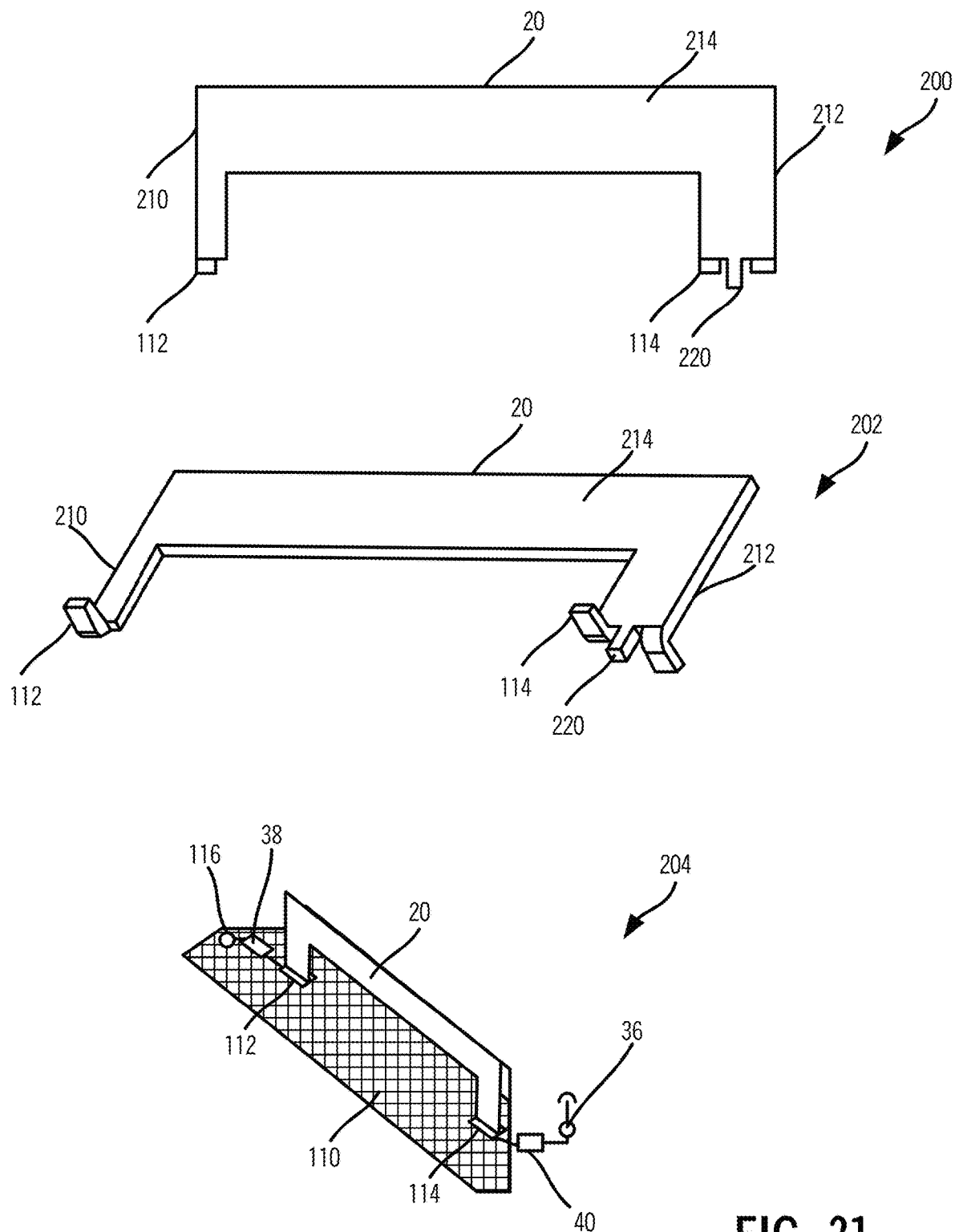
FIG. 21 is various diagrams of an exemplary implementation of the antenna described herein utilizing stamping and Surface Mount Technology (SMT).

FIG. 21 is various diagrams of an exemplary implementation of the antenna 20 utilizing stamping and Surface Mount Technology (SMT). Advantageously, the antenna 20 used in the antenna system 30 is cost effective to produce, designed for mechanical stability, and designed with minimal parasitic capacitance ($C_p$). The parasitic capacitance can severely impact radiation efficiency. The antenna 20 is formed through a stamping process (200). In FIG. 21, the antenna 20 is shown installed on the ground 110 as shown in more detail in FIG. 8, after stamping where the feet 112, 114 and the body of the antenna 20 are formed. The antenna 20 includes a first vertical side 210 with the foot 112 at an end, a second vertical side 212 with the foot 114 at an end, and a horizontal portion 214 between the first vertical side 210 and the second vertical side 212 opposite of the feet 112, 114. Those skilled in the art will recognize "horizontal" and "vertical" are used for logical and relative purposes and in a practical deployment of the antenna 20 may be any physical orientation. The antenna 20 can also include an alignment pin 220 which is inserted into the PCB 100 (FIG. 8). After stamping, the feet 112, 114 are folded (202) such as in opposite directions from one another for better mechanical stability and for less parasitic capacitance. The parasitic capacitance gets distributed from the feet 112, 114 on several small patches (instead of one big patch). The alignment pin 220 is used during the SMT process. The antenna 20 is shown installed on the ground 100 (204).

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
configuring a first antenna of a plurality of antennas in a wireless device to operate in a configured mode of a plurality of modes, wherein the plurality of modes include a first mode of operating as a quarter wave for operation in a 2.4 GHz band, a second mode of operating as a half wave for operation in a 5 GHz band, and a third mode of operating simultaneous as a half wave and a quarter wave for operation in both the 2.4 GHz band and the 5 GHz band, the configuration performed via radio frequency (RF) switches selecting the first mode, second mode and third mode, the RF switches further performing tuning operations based on the selected first mode, second mode and third mode; and
operating a first radio of a plurality of radios that is connected to the first antenna in the configured and selected mode of the first antenna.

2. The method of claim 1, further comprising
reconfiguring the first antenna from the configured mode to a different mode of the plurality of modes.

3. The method of claim 1, further comprising
configuring a second antenna of the plurality of antennas to operate in a second configured mode of the plurality of modes; and
operating a second radio of the plurality of radios connected to the second antenna in the second configured mode of the second antenna.

4. The method of claim 3, wherein the second configured mode is different from the configured mode.

5. The method of claim 1, wherein the configuring is performed electronically via settings in a terminating network and a matching network.

6. The method of claim 1, wherein the configuring is performed by tuning components connected to the first antenna.

7. The method of claim 1, wherein the configuring is performed by setting a plurality of switches.

8. The method of claim 1, wherein the configuring is performed by tuning components connected to the first antenna and based on a fact the 2.4 GHz band and the 5 GHz band are approximately 2× in frequency.

9. The method of claim 1, wherein the configuring is performed for any of i) diversity, ii) Multiple-Input and Multiple-Output (MIMO) dimension, and iii) antenna pattern.

10. The method of claim 1, wherein the wireless device is a wireless access point.

11. The method of claim 1, wherein the plurality of antennas are connected to the plurality of radios via a plurality of switches.

12. A radio system comprising:
a plurality of antennas in a wireless device each configured to operate in a mode of a plurality of modes, wherein the plurality of modes include a first mode of operating as a quarter wave for operation in a 2.4 GHz band, a second mode of operating as a half wave for operation in a 5 GHz band, and a third mode of operating simultaneous as a half wave and a quarter wave for operation in both the 2.4 GHz band and the 5 GHz band;
a plurality of radios configured to connect to the plurality of antennas; and
radio frequency (RF) switches configured to selected the mode from a plurality of modes, the RF switches further configured to tune operations of the plurality of antennas based on the selected first mode, second mode and third mode,
wherein a first antenna of the plurality of antennas is configured to operate in a configured mode of the plurality of modes, and wherein a first radio of the plurality of radios connected to the first antenna is configured to operate in the configured mode of the first antenna.

13. The radio system of claim 12, wherein the first antenna is reconfigured from the configured mode to a different mode of the plurality of modes via settings.

14. The radio system of claim 13, wherein the second antenna is configured in a mode of the plurality of modes that is different from the configured mode.

15. The radio system of claim 13, wherein the first antenna is configured electronically via settings in a terminating network and a matching network.

16. The radio system of claim 13, wherein the first antenna is configured by tuning components connected to the first antenna.

17. The radio system of claim 13, wherein the first antenna is configured by setting a plurality of switches.

18. The radio system of claim 13, wherein the first antenna is configured by tuning components connected to the first antenna and based on a fact the 2.4 GHz band and the 5 GHz band are approximately 2× in frequency.

19. The radio system of claim 13, wherein the first antenna is configured for any of i) diversity, ii) Multiple-Input and Multiple-Output (MIMO) dimension, and iii) antenna pattern.

20. The radio system of claim 13, wherein the plurality of antennas are connected to the plurality of radios via a plurality of switches.

* * * * *